United States Patent
Suzumura et al.

[11] Patent Number: 5,989,436
[45] Date of Patent: *Nov. 23, 1999

[54] METHOD AND DEVICE FOR DEHYDRATING HEAVY OILS

[75] Inventors: Hiroshi Suzumura; Masato Kaneko; Isao Matsuura; Masami Fukunaga, all of Hiroshima-ken; Masaki Iijima, Tokyo, all of Japan

[73] Assignee: Mitsubishi Jukogyo Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/747,782

[22] Filed: Nov. 14, 1996

[30] Foreign Application Priority Data

Jan. 31, 1996 [JP] Japan ................................. 8-015493

[51] Int. Cl.$^6$ ............................ B01D 17/06; B01D 17/04
[52] U.S. Cl. .......................... 210/708; 210/800; 210/748; 208/188; 204/665
[58] Field of Search ..................................... 210/800, 708, 210/748, 532.1, 738; 208/188; 204/665

[56] References Cited

U.S. PATENT DOCUMENTS 4,407,707  10/1983  Merchant et al. ...................... 210/708
5,334,317   8/1994  Sichtermann et al. .................. 210/708

FOREIGN PATENT DOCUMENTS 53-111649   9/1978   Japan.
59-152991   8/1984   Japan.

*Primary Examiner*—Robert J. Popovics
*Attorney, Agent, or Firm*—Alston & Bird LLP

[57] ABSTRACT

A method and a device for dehydrating a heavy oil wherein an emulsion of water and a heavy oil is mixed in a stirring chamber together with a suitable amount of an emulsion breaker, the mixture is subjected to separation in a two-phase separation tank to a heavy oil-rich component and a water-rich component, the heavy oil-rich component is then fed to a dehydrator of a high voltage charge type in which separation to a dehydrated heavy oil and a water-rich component is effected, the water-rich component fractions supplied from the two-phase separation tank and the dehydrator are mixed in a pipeline, the mixture thus obtained is admixed with an O/W emulsion breaker and then, fed to a stirring chamber and finally separated to a heavy oil-containing component and a heavy oil-free water layer in a second separation chamber.

5 Claims, 6 Drawing Sheets

FIG. I

METHOD AND DEVICE FOR DEHYDRATING HEAVY OILS

BACKGROUND OF THE INVENTION

The present invention relates to a method and a device for dehydrating a heavy oil, for example, a method applicable to dehydrating operation in a orimulsion burning device.

Technology for dehydrating heavy oils includes (i) methods in which reagents are added, (ii) methods in which liquids are separated by means of heat diffusion, and (iii) methods in which liquids are separated by means of electricity. A large number of the methods in which reagents are added as designated in (i) above have been disclosed in patent applications including that filed by NIKKO ENGINEERING (JP-A-53-111649) which is targeted to an oil-containing waste water, i.e., a system containing a minimum amount of oils in a large volume of water. In this publication, a method is disclosed in which an acid and an emulsion destroyer are added to a waste water to effect emulsion break, followed by neutralization, aggregation and floating/separating processes, whereby facilitating removal of oil components in a COD-rich waste water, SS and surfactants. The emulsion destroyer used herein is otherwise referred to as an emulsion breaker, which is a chemical serving to break the interface of the emulsion and to promote aggregation and integration of dispersed particles, thus being a kind of surfactants.

In a method for desalting a crude oil disclosed by HAKUTO NARCO CHEMICAL (JP-A-59-152991), a water-in-oil (W/O) emulsion breaker and an oil-in-water (O/W) emulsion breaker are added to a feed crude oil and to a washing water, respectively, whereby reducing the oil content in the waste water while improving the desalting rate and dehydrating rate of the crude oil. However, this method is not advantageous economically since it requires the emulsion breakers in large amounts to raise the dehydrating rate. In addition, it involves disadvantage of a prolonged residential time during two-phase separation effected by the emulsion breakers, which results in slow production as well as necessity of a huge two-phase separation tank while allowing for only a limited amount of dehydration even with a large amount of the emulsion breakers.

In the methods designated by (ii) above in which liquids are separated by means of heat diffusion it is very difficult to effect oil/water separation exclusively by means of the heat although some auxiliary effect can be achieved.

In the methods designated by (iii) above in which liquids are separated by means of electricity, application of a high voltage to an orimulsion containing 30% water results in a current through the water to create a overcurrent state, showing almost no dehydrating effect.

One of the heavy crude oils, orinocotar produced in Venezuela, is an extremely heavy, highly viscose and not suitable to be transported. Accordingly, it is transported after dispersing the water by a dispersant to convert to an emulsion (hereinafter referred to as orimulsion), and then used as, for example, a fuel. However, burning of the orimulsion containing 30% water as it involves disadvantage of heat loss during burning as well as reduced desulfurization performance during subsequent removal of sulfur oxides contained in gases by flue-gas desulfurization. Nevertheless, by burning the orimulsion containing 30% water after dehydrating to the water content of 1% by weight, the heat loss during the burning can be reduced by 2.7%, the water content in a boiler waste gas is reduced each by 4%, the waste gas temperature in the flue-gas desulfurization device is lowered by 5° C., whereby achieving the advantage of 2% increase in desulfurization performance. Based on such findings, the present invention has been established.

SUMMARY OF THE INVENTION

An objective of the present invention is to provide, for the purpose of overcoming the disadvantages of the conventional dehydrating methods described above, a method for dehydrating orimulsion which is economically advantageous and simple. The present invention comprises a combination of a method employing emulsion breakers as designated by (i) above and a method employing a high voltage charge process as designated by (iii) above.

In accordance with the present invention, there is provided a method for dehydrating a heavy oil wherein an emulsion of water and a heavy oil is mixed in a stirring chamber together with a suitable amount of an emulsion breaker, the mixture is subjected to separation in a two-phase separation tank to a heavy oil-rich component and a water-rich component, the heavy oil-rich component is then fed to a dehydrator of a high voltage charge type in which separation to a dehydrated heavy oil and a water-rich component is effected, the water-rich component fractions supplied from the two-phase separation tank and the dehydrator are mixed in a pipeline, the mixture thus obtained is admixed with an O/W emulsion breaker and then, fed to a stirring chamber and finally separated to a heavy oil-containing component and a heavy oil-free water layer in a second separation chamber.

In another aspect of the present invention, there is provided a device for dehydrating a heavy oil comprising:

a stirring chamber for mixing an emulsion of water and a heavy oil with an emulsion breaker;

a two-phase separation tank for separating the mixture thus obtained to a heavy oil-rich component and a water-rich component;

a dehydrator of a high voltage charge type for separating the heavy oil-rich component thus obtained to a dehydrated heavy oil and a water-rich component;

a pipeline for mixing the water-rich component supplied from the two-phase separation tank and the water-rich component supplied from the dehydrator;

a second stirring chamber to which the mixture obtained in the pipeline admixed with an O/W emulsion breaker is supplied or in which the mixture obtained in the pipeline is admixed with an O/W emulsion breaker; and, a second separation chamber for separating the mixture obtained in the second stirring chamber to a heavy oil-containing component and an oil-free water layer.

Thus, in the method described above, an emulsion of water and a heavy oil is mixed in a stirring chamber in the presence of a suitable amount of an emulsion breaker. After feeding from the bottom of the stirring chamber through a pump to the two-phase separation tank, the heavy oil-rich component is allowed to flow from the lower region of the tank while the water-rich component is allowed to flow from the upper region of the tank. Then the heavy oil flowing from the lower region runs into a dehydrator of a high voltage charge type, from the lower and upper regions of which a dehydrated heavy oil and the water-rich component, respectively, are allowed to flow. After mixing the water-rich components from the two-phase separation tank and from the dehydrator in the pipeline followed by addition of the O/W emulsion breaker, the mixture is introduced into the stirring chamber. After passing through this stirring chamber, the heavy oil-containing component and the oil-free water layer can be supplied from the lower region and the higher region, respectively, of the second separation chamber. In this process, the emulsion of water and the heavy oil to be treated usually contains 26 to 32% by weight of water.

According to the present invention, for the purpose of increasing gravity sedimentation velocity, a chemical reagent (emulsion breaker) is added to break the interface of the emulsion and to promote aggregation and integration of the dispersed particles, whereby effecting enlargement of the particles. The particles thus enlarged are subjected to gravity sedimentation in accordance with Stokes' law, and then removed. In order to dehydrate an orimulsion containing 30% water, difference in specific gravity is utilized to separate in the two-phase separation tank after adding an emulsion breaker at a concentration of 40 to 100 ppm. As shown in FIG. 2, the specific gravity of orinocotar is very close to that of water, and orinocotar is heavier than water at a temperature of 20° C. or lower and at a temperature of 140° C. or higher, indicating that the separation on the basis of the specific gravity is extremely difficult at an intermediate temperature, i.e., within the range from 20 to 140° C.

The dehydrator of a high voltage charge type is described below. It is employed to apply a high voltage field to a dispersion system to force the dispersed particles to hit against each other, whereby promoting aggregation and integration of the dispersed particles. In such high voltage field, the dispersed particles are in the dipolar state as shown in FIG. 3, and electric attraction force is established between the particles. The attraction force is represented by the formula shown below.

Formula 1

$$F = k \cdot E^2 \cdot a^6 / d^4$$

wherein, F denotes an electric attraction force between particles, E denotes potential gradient, k denotes a constant, a denotes a dispersed particle size, and d denotes a distance between dispersed particles.

Thus, the attraction force established between the dispersed particles of salt-containing water which is a constituent of the emulsion in a crude oil is in proportion with the particle size raised to the 6th power and in inverse proportion with the distance between the centers raised to the 4th power. Accordingly, in order to promote aggregation and integration of the dispersed particles, it is most effective to minimize the distance between the centers.

The orimulsion containing 30% water is an O/W emulsion having oil particles dispersed in water. To this emulsion, an emulsion breaker is added. As shown in FIG. 4, Kitahara, Furusawa et al (reference, issued from KOGAKU TOSHO, "Chemical of dispersion and emulsion systems", page 238) proposed that the integration between the particles occurs when the molecules in the adsorption layer between the aggregated particles move and desorb on the interface due to the compression force and sliding force between the particles whereby causing direct contact of drops with each other. In this emulsion breaker addition process, the dehydration performance is limited regardless of the increase in the amount of the emulsion breaker, and it takes about 10 minutes to allow integrated oil drops to separate from water. The mechanism of separation is explained in accordance with Stokes' law with regard to usual liquid drop movement.

The starting orimulsion is an O/W (oil in water) emulsion having oil particles dispersed in water, but it is converted to a W/O emulsion having water particles dispersed in oil after addition of an emulsion breaker followed by dehydration. This W/O emulsion is subjected to the treatment in a dehydrator of a high voltage charge type.

As shown in FIG. 5, with the charge by a high voltage, the charged water drops come together in the direction of Field G as indicated in (a), and then the membrane at the point of contact is broken under static voltage force P as major effect force T as indicated in (b), and integration of the water particles occurs as indicated in (c) and a sphere is formed as indicated in (d).

Example of the "heavy oil" referred herein are the three specified in Table 1 in accordance with the heavy oil standard (JIS K 2205-1980).

TABLE 1

| Type | Item | Reaction | Flash point [° C.] | Kinematic viscosity (50° C.) [cSt] {mm²/s} | Fluidizing point [° C.] | Residual carbon content [wt %] | Moisture [vol %] | Ash [wt %] | Sulfur [wt %] | (Remarks) Major utility |
|---|---|---|---|---|---|---|---|---|---|---|
| Type 1 | No. 1 | Neutral | 60 or higher | 20 or less {20 or less} | 5 or less[1] | 4 or less | 0.3 or less | 0.05 or less | 0.5 or less | Ceramics/Metal refining/Air conditioning |
|  | No. 2 | Neutral | 60 or higher | 20 or less {20 or less} | 5 or less[1] | 4 or less | 0.3 or less | 0.05 or less | 2.0 or less | Small internal combustion engine/ Air conditioning |
| Type 2 |  | Neutral | 60 or higher | 50 or less {50 or less} | 10 or less[1] | 8 or less | 0.4 or less | 0.05 or less | 3.0 or less | Internal combustion engine |
| Type 3 | No. 1 | Neutral | 70 or higher | 250 or less {250 or less} | — | — | 0.5 or less | 0.1 or less | 3.5 or less | General/Large boiler /Steel/Large internal combustion engine |
|  | No. 2 | Neutral | 70 or higher | 400 or less {400 or less} | — | — | 0.6 or less | 0.1 or less | — | Same as above |
|  | No. 3 | Neutral | 70 or higher | over 400 and 1000 or less {over 400 and 1000 or less} | — | — | 2.0 or less | — | — | High viscosity burner |

Note.
[1]Fluidizing point of type 1 and 2 oils for cool temperature is 0° C. or lower, while that for warm temperature is 10° C. or lower.

A "heavy oil" according to the present invention generally includes residual oils obtained by distilling a crude oil, petroleum residues obtained by extracting a crude oil with a solvent, and tar pitch obtained as a by-product in the process of decomposition reaction of a crude oil such as thermal and catalytic decompositions. In addition, coal based oils such as liquefied coal oils and solvent extracts from coals and bitumens such as sand oil and oil shale are also included. These materials are characterized in common by high boiling points, appearance as blackish brown or black liquid, semi-solid or solid in some cases, and ability of being dissolved in strong solvents such as pyridine and quinoline, by which they are differentiated from a coal. Nevertheless, a heavy oil according to the present invention may be a mixture containing complicated compounds having an aromatic ring skeleton together with other compounds, similarly to a coal.

Examples of the emulsion breaker employed in the present invention are N7710 manufactured by NARCO, B733 manufactured by HAKUTO KAGAKU and DS656 manufactured by KURITA KOGYO (all anionic surfactants), which are used independently in general. The amount of an emulsion breaker added is 20 to $150 \times 10^{-4}\%$ by weight, preferably 40 to $70 \times 10^{-4}\%$ by weight based on the weight of the emulsion of water and a heavy oil.

Examples of the dehydrator of a high voltage charge type are commercially available AC type dehydrator and double hot AC type dehydrator manufactured by NATCO, and the electric field intensity applied is 2 to 4 KV/cm per 22 mm thickness of the emulsion to be treated.

According to the present invention, by combining a method using an emulsion breaker and a high voltage charge method, a heavy oil-containing component and an oil-free water layer in an emulsion of water and a heavy oil can be separated efficiently and economically, particularly with a compact-sized device within a short treatment period. Since the water layer obtained after the treatment contains substantially no oils, it can be recycled as it is as a coolant for a flue-gas desulfurization device.

DESCRIPTION OF THE PREFERRED EMBODIMENT

Figure 1:
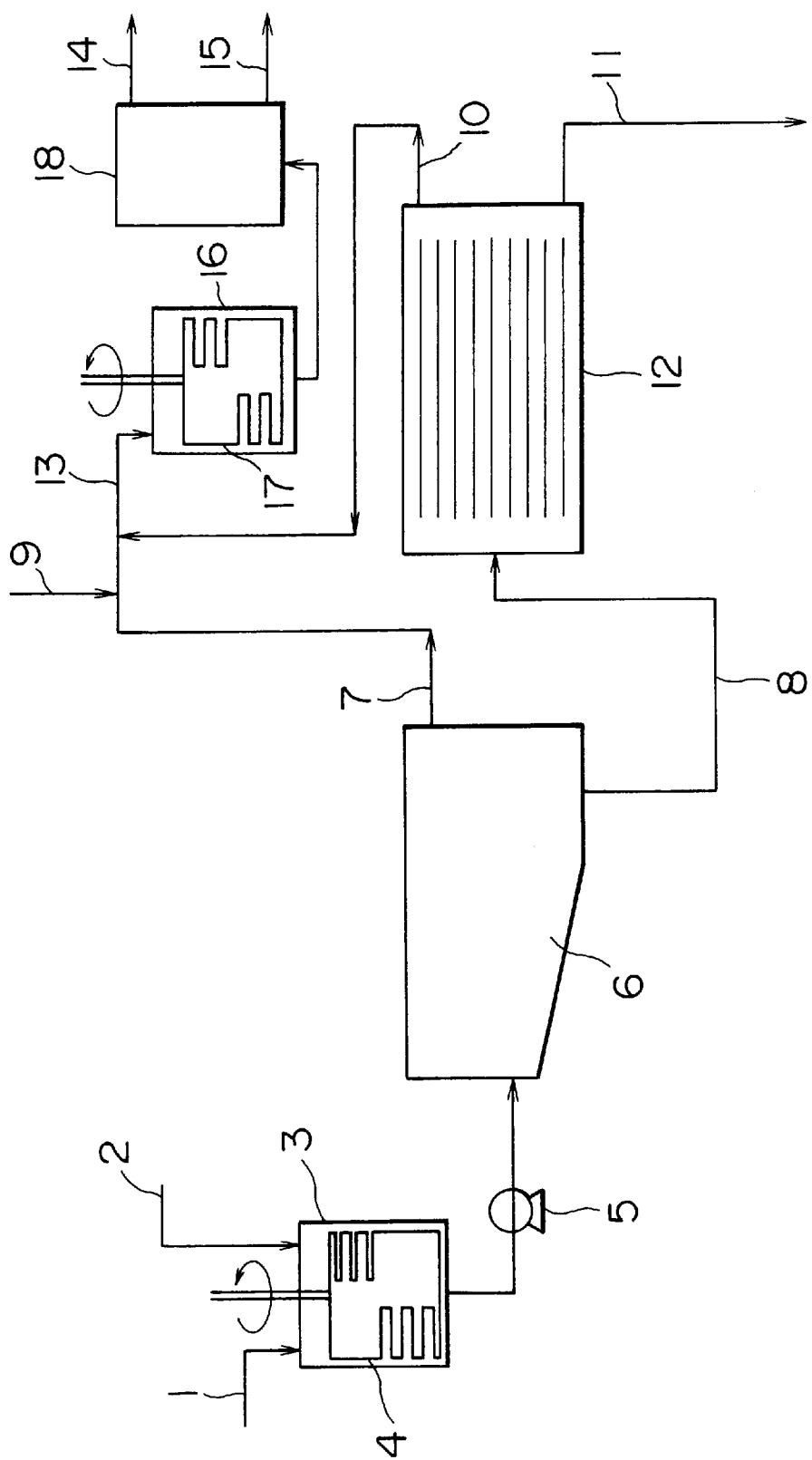
FIG. 1 shows a flow indicating a process of Example 1 according to the present invention.
Figure 2:
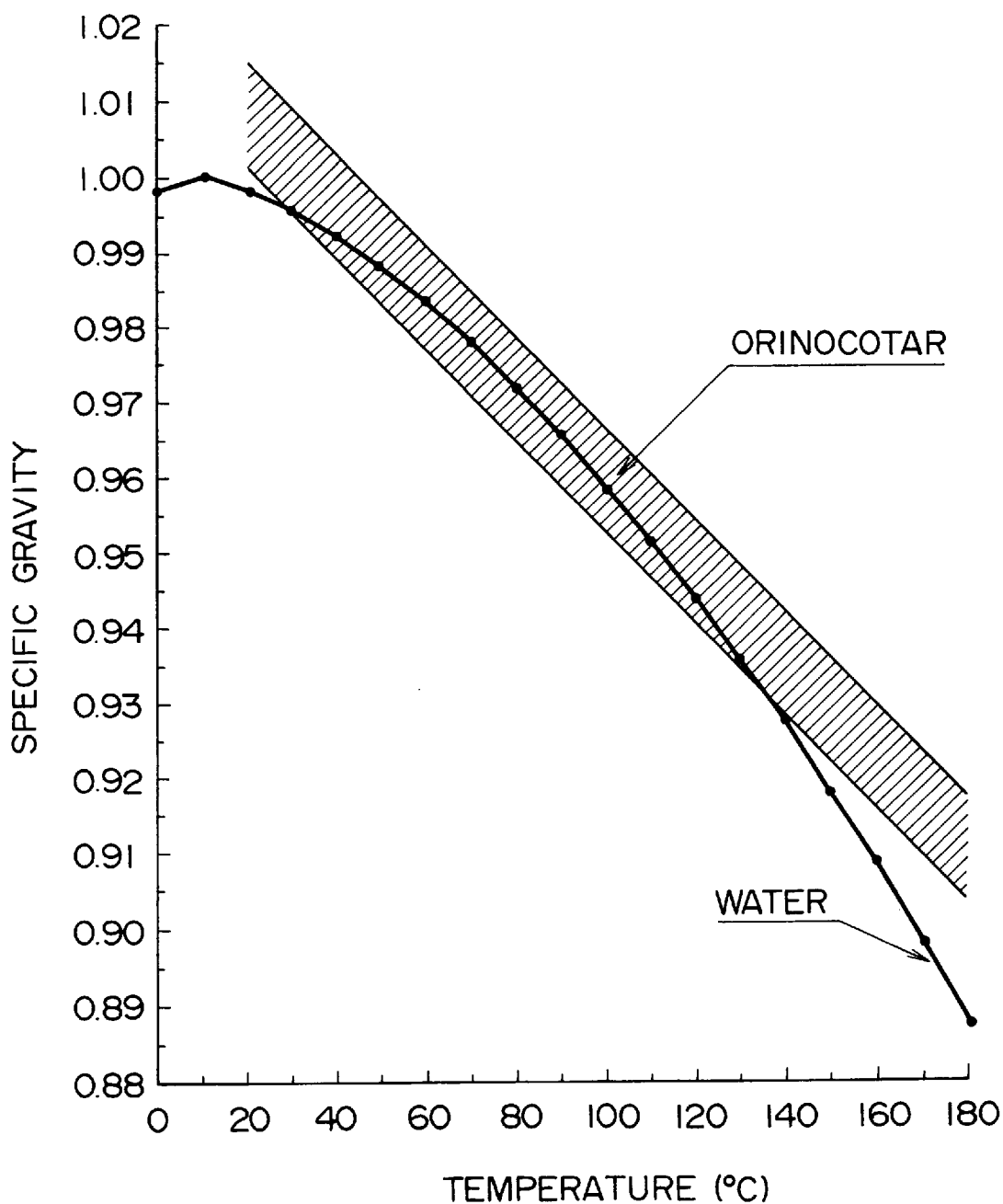
FIG. 2 shows a graph indicating the difference in specific gravity between orinocotar and water in relation with temperature.
Figure 3:
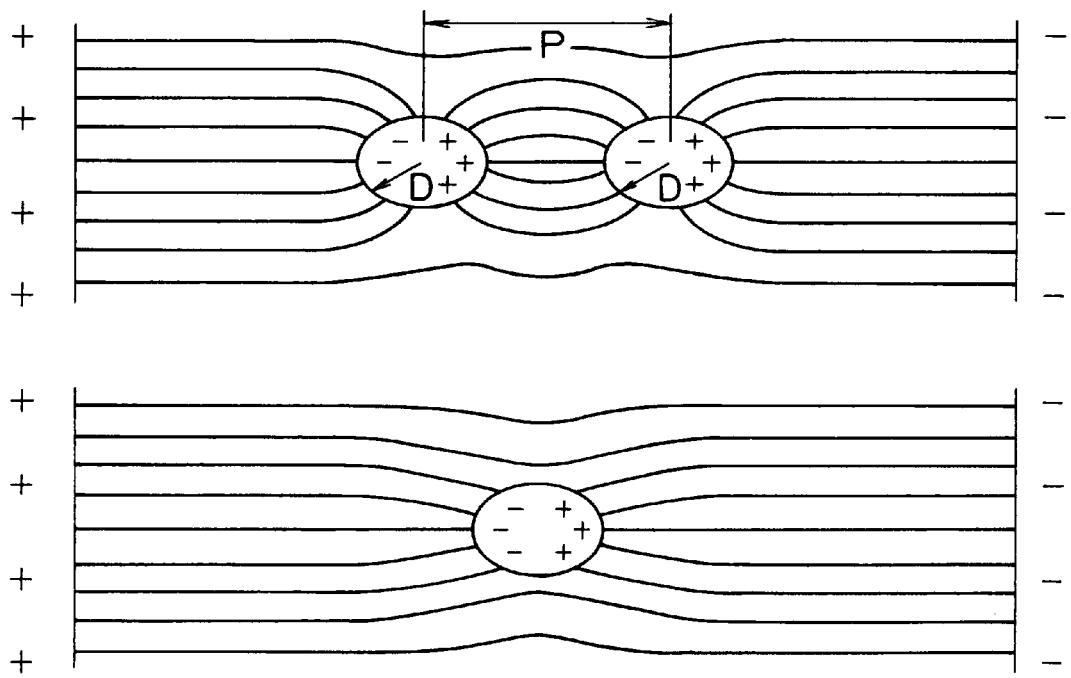
FIG. 3 shows a schematic view of the state of the electric dipole of the dispersed particles.
Figure 4:
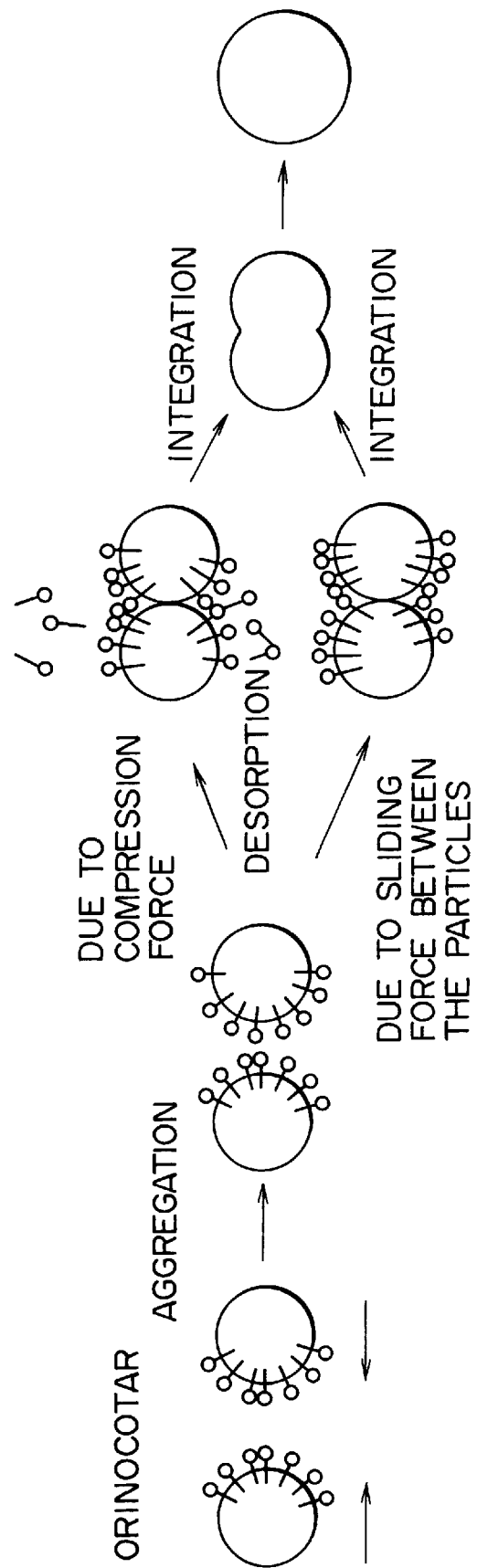
FIG. 4 shows a schematic view of the emulsion integrated by an emulsion breaker.
Figure 5A:
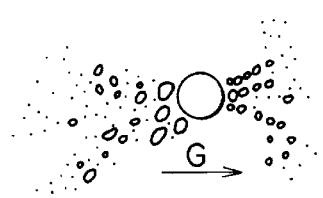
FIG. 5 (a) to (d) show schematic views of water particles integrated by high voltage charge.
Figure 5B:
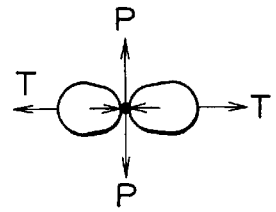
Figure 5C:
Figure 5D:
Figure 6:
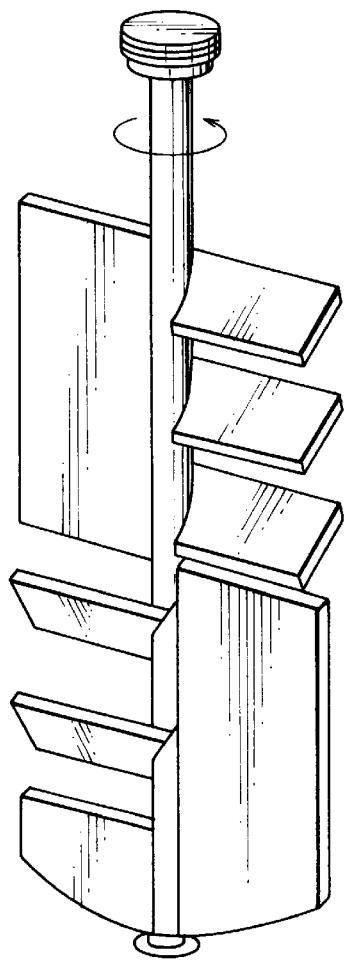
FIG. 6 shows an outline of SUMMELER blades for low speed thorough mixing.

According to one embodiment of a flow in accordance with the present invention as shown in FIG. 1, Example 1 was conducted. Orimulsion 1 containing 30% water was mixed with emulsion breaker 2 in stirring chamber 3. At this stage, the temperature of the stirring chamber was kept at 170° C., and the emulsion breaker (manufactured by NARCO, tradename N7710) was injected at the concentration of 77 ppm. The stirring blades employed was SANMELER (asymmetric) blades 4 and the mixing was effected at the rotation speed as low as about 100 rpm.

Then, the orimulsion which had been mixed with the emulsion breaker was supplied via pump 5 to two-phase separation tank 6, The temperature and pressure in this separation tank 6 were kept at 170° C. and 14 kg/cm²·G, respectively, and the residential time was set at 10 minutes. The concentrations at the upper and lower outlets of this two-phase separation tank 6 were described below. Thus, the water content in the orimulsion in pipeline 8 was reduced to 1.8% by weight, while the oil content in the water in pipeline 7 was 28 mg/l, with the composition of water being indicated in Table 2.

TABLE 2

| | Component | | | | | | | | | | | | |
|---|---|---|---|---|---|---|---|---|---|---|---|---|---|
| | Mg | K | Ca | Na | Cr | V | Ti | Fe | Cu | Mn | Zn | Al | Ni |
| Sample amount | mg/l | mg/l | mg/l | mg/l | mg/l | mg/l | mg/l | mg/l | mg/l | mg/l | mg/l | mg/l | mg/l |
| Separated water | 140 | 16.0 | 12.8 | 10.3 | 2.98 | 1.65 | 0.09 | 0.02 | <0.01 | <0.01 | <0.01 | <0.01 | <0.01 |

| | Component | | | | | |
|---|---|---|---|---|---|---|
| | PH | $NO_3^-$ | $NO_2^-$ | $Cl^-$ | $SO_4^{2-}$ | Oil content |
| Sample amount | | — | mg/l | mg/l | mg/l | mg/l | mg/l |
| Separated water | 8.40 | | 484 | 104 | 13 | 4 | 28 |

Then, the orimulsion containing 1.8% by weight of water in pipeline 8 was subjected to dehydrator 12 of a high voltage charge type. In the dehydrator, in which a plural of plates were provided at the interval of 22 mm, the temperature was set at 180° C., pressure at 14 kg/cm²·G, electric field intensity at 4.4 KV/cm and residential time at 10 minutes. As a result, the water content in the orinocotar in pipeline 11 became 0.92% by weight. Then, water layer 10 running from dehydrator 12 and water layer 7 running from two-phase separation tank 6 were admixed before or after injection of O/W emulsion breaker 9 (manufactured by NARCO, N7710) at the concentration of 40 ppm, and then passed through pipeline 13 and then mixed in the second stirring chamber 16. Then, the mixture was passed through the second two-phase separation tank 18 at atmospheric temperature and recovered as separated to water layer 14 having an oil content of 1 mg/l or less and oil layer 15. Water layer 14 can be recycled as a coolant for a flue-gas desulfurization device.

Figure 7:
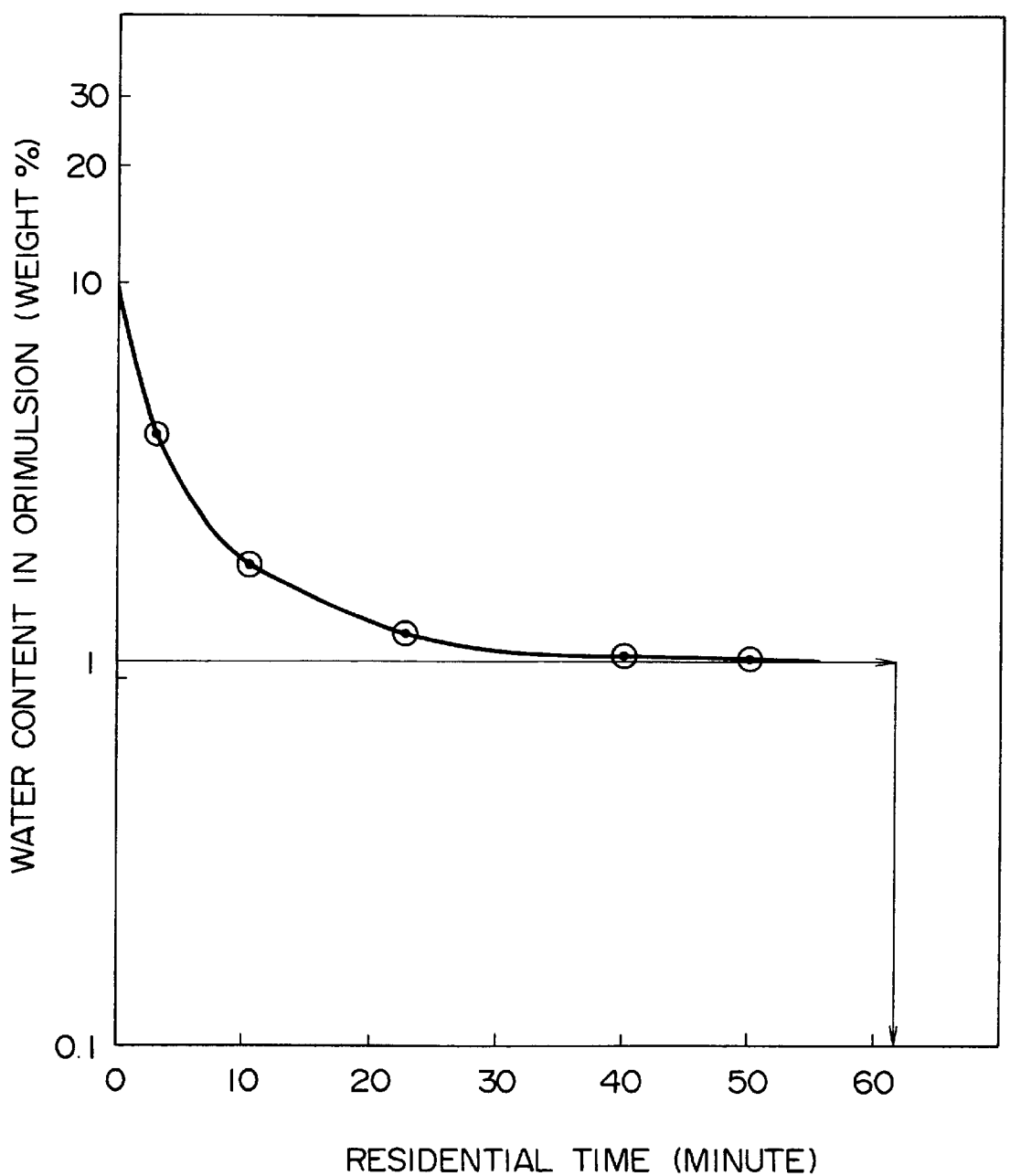
FIG. 7 shows a graph indicating the relationship between the residential time after addition of an emulsion breaker and the water content in an orimulsion.

As shown in FIG. 7, when the emulsion breaker was injected at about 77 ppm to the orimulsion containing 30% by weight of water, about 63 minutes of the residential time is required based on the results of basic experiments to reduce the water content to 1% by weight, suggesting that a two-phase separation tank which is 6.3 times as great as that employed in this example is required. Therefore, it is evident that the combination of the emulsion breaker with the dehydrator according to the present invention enables more rapid production and use of more compact-sized devices.

In the case mentioned above, even when using 150 ppm of the emulsion breaker which was twice as much, almost no change in the curve of dehydration rate vs time was observed.

The water layer thus obtained can be recycled as a coolant for a flue-gas desulfurization device since the oils were eliminated completely.

Many other variations and modifications of the invention will be apparent to those skilled in the art without departing from the spirit and scope of the invention. The above-described embodiments and examples are, therefore, intended to be merely exemplary, and all such variations and modifications are intended to be included within the scope of the invention as defined in the appended claims.

What is claimed is:

1. A method for dehydrating an oil, comprising the steps of:
   mixing an emulsion of water and an oil with an emulsion breaker to form a first mixture;
   separating the first mixture into an oil-rich component and a first water-rich component;
   treating the oil-rich component in a dehydrator to effect separation into a dehydrated oil of lower water content than the oil-rich component and a second water-rich component;
   combining the first water-rich component and the second water-rich component to form a water component mixture;
   mixing the water component mixture with an emulsion breaker; and
   separating the water component mixture into an oil-containing component and a substantially oil-free water layer.

2. A method according to claim 1, wherein the substantially oil-free water layer is recycled for use as a coolant.

3. A method according to claim 1, wherein the oil is a heavy oil.

4. A method according to claim 1, wherein the emulsion of water and an oil comprises at least about 26 weight percent of water.

5. A method according to claim 1, wherein the substantially oil-free water layer comprises less than about 1 mg/l of oil.

* * * * *